(12) United States Patent
Garcillan Rueda et al.

(10) Patent No.: US 8,083,491 B2
(45) Date of Patent: Dec. 27, 2011

(54) WIND TURBINE BLADE

(75) Inventors: Luis Miguel Garcillan Rueda, Madrid (ES); Michael Friedrich, Silkeborg (DK); Enrique Gomez De Las Heras Carbonell, Madrid (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 406 days.

(21) Appl. No.: 12/398,488

(22) Filed: Mar. 5, 2009

(65) Prior Publication Data
US 2009/0226324 A1   Sep. 10, 2009

(30) Foreign Application Priority Data

Mar. 7, 2008   (ES) .................................. 200800675

(51) Int. Cl.
*F01D 5/18*   (2006.01)

(52) U.S. Cl. ................ 416/241 A; 416/232; 416/241 R; 415/115; 415/116

(58) Field of Classification Search .................. 416/140, 416/223 A, 223 R, 224, 225, 235, 241 A, 416/241 R, 500
See application file for complete search history.

(56) References Cited

U.S. PATENT DOCUMENTS

| | | | | |
|---|---|---|---|---|
| 5,988,982 A | * | 11/1999 | Clauer | 416/241 R |
| 6,551,064 B1 | * | 4/2003 | Mannava et al. | 416/223 A |
| 6,672,838 B1 | * | 1/2004 | Crall et al. | 416/224 |
| 6,719,853 B2 | * | 4/2004 | Buergel et al. | 148/276 |
| 6,752,593 B2 | * | 6/2004 | Clauer et al. | 415/200 |
| 7,229,253 B2 | * | 6/2007 | Broderick et al. | 416/225 |
| 7,575,418 B2 | * | 8/2009 | Gigliotti et al. | 416/241 R |
| 7,761,993 B2 | * | 7/2010 | Mahler et al. | 29/889.7 |
| 2009/0028718 A1 | * | 1/2009 | Enevoldsen et al. | 416/223 R |

* cited by examiner

*Primary Examiner* — Michael Lebentritt
(74) *Attorney, Agent, or Firm* — Ladas & Parry LLP

(57) ABSTRACT

A wind turbine blade (11) having an aerodynamic profile with a leading edge (13), a trailing edge (15) and suction and pressure sides (17, 19) between the leading edge (13) and the trailing edge (15), wherein the pressure side (19) includes a modified zone (31) shaped for reducing the negative lift coefficient which is done whether attaching a device (33) such as a stall strip to the blade (11) or attaching or inserting into the blade (11) a deformable device and actuator means for providing the shape and size changes in it.

11 Claims, 2 Drawing Sheets

WIND TURBINE BLADE

FIELD OF THE INVENTION

The invention relates to wind turbine blades that minimize the fatigue and extreme loads and more in particular to wind turbine blades that minimize the fatigue and extreme loads in the mid-span section of the blade.

BACKGROUND

A current challenge in the wind turbine industry is providing a blade design minimizing the fatigue and extreme loads and, consequently, allowing the reduction of the material, weight and prize of the blade.

The airfoil sections on the wind turbine blades in normal production operate at angles of attack ranging from low angles of attack, where the lift is low on the linear part of the lift versus angle of attack curve, to high angles of attack where the airfoil section is just before stall or in stall.

The variation of the aerodynamic loads can be measured as the oscillations of the aerodynamic lift and drag. The standard deviation statistic of a data set or time series is often used as a good indicator of the oscillation. A high standard deviation of lift and drag means that the variation of the aerodynamic loads is high resulting in higher fatigue loads.

Particularly in large blades the different sections of the blade are subject to different loads. In pitch controlled wind turbines, when the rated power is reached or at high wind speeds, the blades are pitched towards the feathered position reducing the lift coefficient to remove the excessive energy. In these situations it may happen that the root section of the blade has positive lift and the tip section has negative lift causing high fatigue loads, specially at the mid-span section of the blade.

In other operation situations, the turbine blades are moved towards feathered position in order to slow down the rotor an finally stop the wind turbine. In that case, negative lift is desired in the blades, but very large negative lift during the transition period could lead to large loads in the blades or any other component in the wind turbine.

Another situation where high fatigue loads are encountered is during the pitch variation introduced to minimise the effect of gusts and big scale atmospheric turbulence. When the turbulence involves an increase in the wind speed, the pitch of blade increases reducing the angle of attack so as to reduce the aerodynamic loads. The wind speed increase is usually followed by a wind speed decrease, which requires lower pitch angles and higher angles of attack to produce the same torque. During this process it may occur that part of the blade, usually the outboard, changes from positive angles of attack to negative ones, or vice-versa in a very short time. Since this means that part of the blade will be on the negative lift area of the lift vs. angle of attack curve, and will change to positive area in a very short period of time, from a load point of view, this process imposes on the blade a load that changes its direction with time.

This present invention is intended to provide a solution to these problems.

SUMMARY OF THE INVENTION

An object of the present invention is to provide a wind turbine blade minimizing the fatigue and extreme blade loads, particularly at the mid-span section of the blade.

Another object of the present invention is to provide a wind turbine blade that allows minimizing the fatigue and extreme blade loads in other components of the wind turbine.

These and other objects of the present invention are met by providing a wind turbine blade having an aerodynamic profile with a leading edge, a trailing edge and suction and pressure sides between the leading edge and the trailing edge, including a modified zone in the pressure side, which is shaped for reducing the negative lift coefficient and which is located, in a preferred embodiment, between two sections corresponding to chord positions in the range of 1%-20%, and most preferably in the range 5%-20%, of the chord length, measured from the leading edge.

In a preferred embodiment said modified zone is located along a section of the blade extending between 20%-50% of its length measured from its tip. Hereby a blade that allows reducing the fatigue and extreme loads is achieved without the need of extending said modification along the whole length of the blade.

In another preferred embodiment said modified zone is done attaching a device such as a stall strip to the blade. Hereby a blade that allows reducing the fatigue and extreme loads is achieved by means of an inexpensive device which can be easily attached to the blade, whether during its manufacturing or afterwards.

In another preferred embodiment said modified zone is done attaching or inserting into the blade a deformable device and actuator means for providing the shape and size changes in it. Hereby a blade that allows reducing the fatigue and extreme loads by means of an active controlled device is achieved.

Other features and advantages of the present invention will be understood from the following detailed description in relation with the enclosed drawings.

DETAILED DESCRIPTION OF PREFERRED EMBODIMENTS

In traditional profile design of wind turbine blades the aim is to get the best performance of the profiles as possible which is often understood as having high lift and low drag.

Figure 1:
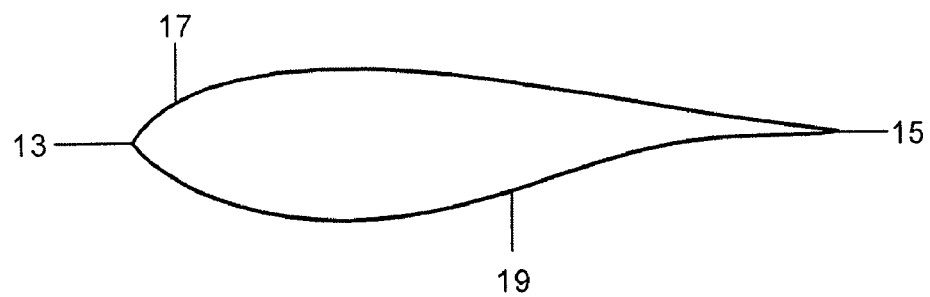
FIG. 1 is a schematic view of a known wind turbine blade profile.

A typical wind turbine blade 11 has generally a flow-optimized profile such as the profile shown in FIG. 1 having a leading edge 13, a trailing edge 15 and a lifting surface with a suction side 17 and a pressure side 19.

Figure 3:
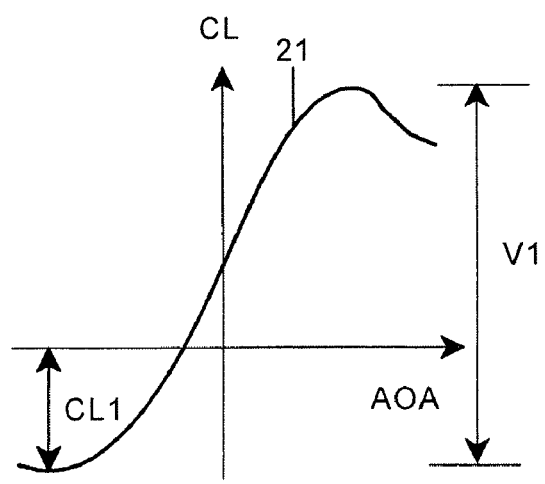
FIG. 3 shows the lift coefficient versus angle of attack curve corresponding to the profile shown in FIG. 1.

FIG. 3 shows a lift coefficient CL versus angle of attack AOA typical curve 21 for that type of profiles. These curves have a maximum and a minimum values for CL, being the maximum associated to positive lift and the minimum to negative lift and there is therefore a significant variation V1 between maximum positive lift and maximum negative lift.

According to the present invention the high fatigue loads appearing in those situations in which the outer section of the blade has a negative lift and suddenly changes to a positive lift or vice versa, especially due to turbulence and gusts, are reduced modifying the profile in the outer section of the blade for reducing its negative lift coefficient.

Figure 4:
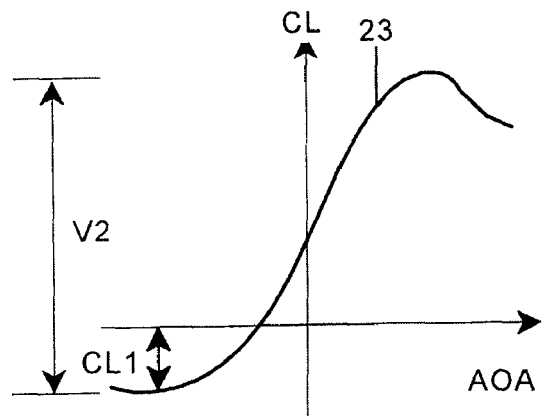
FIG. 4 shows the lift coefficient versus angle of attack curve corresponding to the profile shown in FIG. 2.
Figure 5:
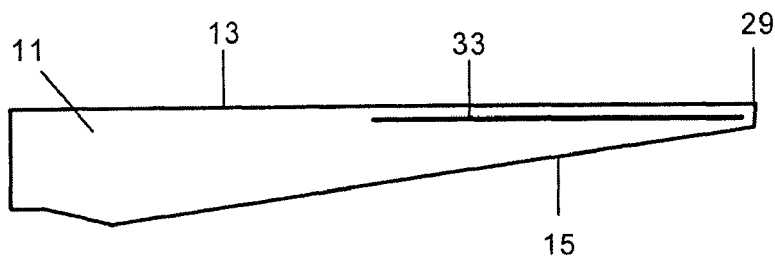
FIG. 5 is a plan view of a blade with an attached device according to the present invention.
Figure 6A:
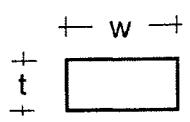
FIGS. 6a, 6b, 6c, 6d, 6e show several stall strips in cross section.
Figure 6B:
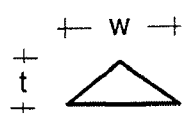
Figure 6C:
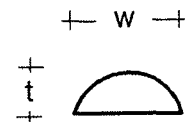
Figure 6D:
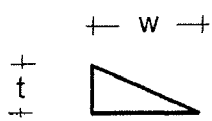
Figure 6E:
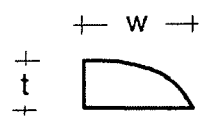

The objective of said modification is a profile with the lift coefficient CL versus angle of attack AOA curve 23 shown in FIG. 4 having a lesser variation V2 between maximum positive lift and maximum negative lift than in the profile shown in FIG. 1.

The removal of lift on the outer part of the blade at negative angles of attack is beneficial for the loads at the mid-span of the blade, specially at high wind. In this situation the outer part of the blade is not needed for producing energy because the inner part produces enough energy. At positive angles of attack said modification has little influence on the performance of the profile.

The reduction in the negative lift coefficient is also helpful to reduce the negative extreme loads appearing in the blade in those situations where the blade is pitching towards feather and the angle of attack goes from positive values to negative ones.

Fatigue loads associated to the rapid variation from positive to negative angles of attack or vice-versa due to gusts and turbulence are also reduced since the value of the maximum negative lift achievable is reduced.

Figure 2:
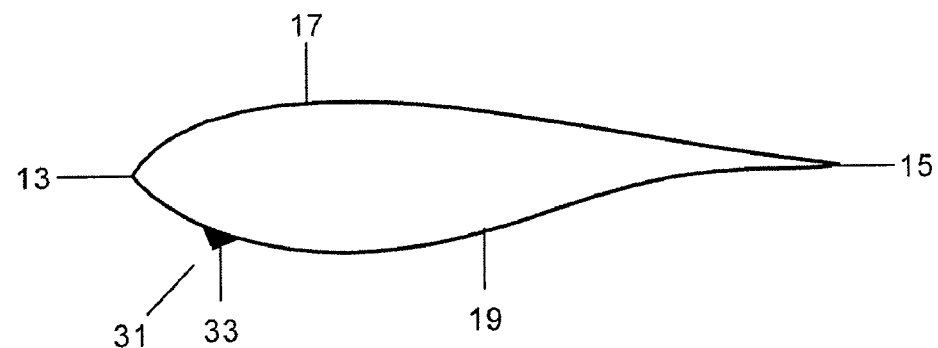
FIG. 2 is a schematic view of a wind turbine blade profile according to the present invention.

FIG. 2 shows a profile with a modified zone 31 in the pressure side 19 which is shaped for stalling the profile at negative angles of attack, thus reducing the negative lift coefficient.

Said modified zone 31 can be implemented during the manufacturing process of the blade or, preferably, attaching a suitable device 33 to a conventional blade.

In one preferred embodiment said device 33 is placed on the pressure side 19 between two sections corresponding to chord positions in the range of 1%-20% of the chord length and, preferably in the range of 5-20% of the chord length, measured from the leading edge 13.

In another preferred embodiment said device 33 is placed along a section of the blade 11 extending in a range of 20%-50% of its length measured from its tip 29.

In another preferred embodiments said device 33 is a stall strip consisting of a small piece of a suitable material, such as plastic, glass fiber, metal or epoxy, having a rectangular or triangular or semi-circular or quarter-circular shape in cross section, as shown in FIGS. 6a 6b, 6c, 6d, 6e, with a maximum width w comprised in the range 0.5-10 mm and a maximum height t comprised in the range 0.1-2 mm.

Said stall strip can be attached to the blade by any suitable fixation means such as bonding, bolting or riveting.

In the wind turbine industry it is known the use of different devices such as stall strips or vortex generators in wind turbine blades for different applications such as adjusting the power or the loads of the wind turbine and preventing undesired vibrations. Said devices are arranged generally on the suction side of the profile for triggering stall. They have been used, for instance, in stall controlled wind turbines to limit the power output at high winds.

It is not known however the use of stall strips or other devices with the objective of minimizing the negative life. In fact, the blade design has been oriented to get the best performance of the profiles and there has not been much focus on negative lift.

In another preferred embodiment said modified zone 31 can be implemented attaching or inserting into a blade a deformable device provided with actuator means for providing the shape and size changes in it.

The actuation of said deformable device is controlled actively so that the modification of the shape of said zone 31 takes place when the reduction of the negative lift coefficient is needed. The active control involves a wind turbine control system monitoring the parameters identifying an event involving a high negative lift coefficient and providing input signals to said actuator means.

A preferred deformable device is a device made of a smart material, i.e. a material that deforms once a voltage is applied to it. It is particularly preferred a deformable device made of an active piezoelectric composite and actuated by electrical means.

The smart material can be a sheet of a smart material applied to the interior and/or exterior surface of the skin of the blade.

Another preferred deformable device is an inflatable device actuated by inflating means. The outer surface of this device may preferably be defined by a skin made of a flexible material, i.e. rubber.

Although the present invention has been fully described in connection with preferred embodiments, it is evident that modifications may be introduced within the scope thereof, not considering this as limited by these embodiments, but by the contents of the following claims.

The invention claimed is:

1. A wind turbine blade (11) having an aerodynamic profile with a leading edge (13), a trailing edge (15), and suction and pressure sides (17, 19) between the leading edge (13) and the trailing edge (15), wherein the pressure side (19) includes a modified zone (31) which is shaped for reducing a negative lift coefficient.

2. A wind turbine blade (11) according to claim 1, wherein said modified zone (31) is located between two sections corresponding to chord positions in the range of 1%-20% of the chord length, measured from the leading edge (13).

3. A wind turbine blade (11) according to claim 2, wherein said modified zone (31) is located between two sections corresponding to chord positions in the range of 5%-20% of the chord length, measured from the leading edge (13).

4. A wind turbine blade (11) according to claim 1, wherein said modified zone (31) is located along a section of the blade (11) extending between 20%-50% of its length measured from its tip (29).

5. A wind turbine blade (11) according to claim 1, wherein said modified zone (31) is done attaching a device (33) to the blade (11).

6. A wind turbine blade (11) according to claim 5, wherein said device (33) is a stall strip rectangular, triangular, semi-circular, or quarter-circular in cross section.

7. A wind turbine blade (11) according to claim 6, wherein the maximum width w of said stall strip is comprised in the range 0.5-10 mm and the maximum height t of said stall strip is comprised in the range 0.1-2 mm.

8. A wind turbine blade (11) according to claim 1, wherein said modified zone (31) is done attaching or inserting into the blade (11) a deformable device and actuator means for providing the shape and size changes in it.

9. A wind turbine blade (11) according to claim 8, wherein said deformable device is made of a smart material and said actuator means are electrical means.

10. A wind turbine blade (11) according to claim 9, wherein said smart material is a piezoelectric material.

11. A wind turbine blade (11) according to claim 8, wherein said deformable device is an inflatable device and said actuator means are inflating means.

* * * * *